United States Patent [19]

Kawahara

[11] Patent Number: 5,087,973
[45] Date of Patent: Feb. 11, 1992

[54] CLAMP SIGNAL PROCESSING APPARATUS
[75] Inventor: Isao Kawahara, Hirakata, Japan
[73] Assignee: Matsushita Electric Industrial Co., Ltd., Osaka, Japan
[21] Appl. No.: 499,422
[22] PCT Filed: Nov. 17, 1988
[86] PCT No.: PCT/JP88/01159
§ 371 Date: Jun. 25, 1990
§ 102(e) Date: Jun. 25, 1990
[87] PCT Pub. No.: WO90/06035
PCT Pub. Date: May 31, 1990
[51] Int. Cl.$^5$ .................. H04N 5/18; H04N 5/21
[52] U.S. Cl. ...................... 358/167; 358/171
[58] Field of Search .................. 358/171–173, 358/167, 36

[56] References Cited

U.S. PATENT DOCUMENTS

| | | | |
|---|---|---|---|
| 4,807,034 | 2/1989 | Takeuchi et al. | 358/167 |
| 4,811,087 | 3/1989 | Engel et al. | 358/172 X |
| 4,833,537 | 5/1989 | Takeuchi et al. | 358/36 X |

FOREIGN PATENT DOCUMENTS

| | | |
|---|---|---|
| 0074683 | 3/1983 | European Pat. Off. |
| 0194129 | 9/1986 | European Pat. Off. |
| 58-124373 | 7/1983 | Japan . |
| 62-172879 | 7/1987 | Japan . |
| 63-222582 | 9/1988 | Japan . |

Primary Examiner—James J. Groody
Assistant Examiner—Mark R. Powell
Attorney, Agent, or Firm—Stevens, Davis, Miller & Mosher

[57] ABSTRACT

An image receiver control apparatus for performing clamp signal processing includes an analog clamper (30) for clamping an input signal on a predetermined DC level, an A/D converter (31) for A/C-converting an output from the analog clamper (30) with a predetermined sample period of time, a timing signal generator (33), a central processing unit (CPU) (38), a data selector (34) for selecting one of a data signal output from the A/D converter (31) and a data signal on a data bus (382) connected to the CPU (38) to supply the selected data signal to the RAM (35), and an address selector (37) for selecting one of an address from the counter (36) and an address on an address bus (381) connected to the CPU (38) to supply the selected address to the RAM (35). The data signals stored in the RAM (35) are subjected to an operation by the CPU (38) such that a noise reduction control signal in correspondence with a level of noise introduced during transfer or recording is determined by obtaining the variance of the data signals stored in said RAM and said noise reduction control signal is outputted from an output port (41) of the CPU (38) in correspondence with a noise level introduced during transfer or storing.

11 Claims, 5 Drawing Sheets

| A/D CONVERTER ||
| REFERENCE VOLTAGE | INPUT ANALOG VOLTAGE → DIGITAL OUTPUT VALUE |
|---|---|
| $V_{RT} = -1.0V$ | $-1.0V \rightarrow 255$ |
| | $-2.0V \rightarrow 128$ |
| $V_{RB} = -3.0V$ | $-3.0V \rightarrow 0$ |

| A/D CONVERTER ||
| REFERENCE VOLTAGE | INPUT ANALOG VOLTAGE → DIGITAL OUTPUT VALUE |
|---|---|
| $V_{RT} = -1.0V$ | $-1.0V \rightarrow 255$ |
| | $-2.0V \rightarrow 170$ |
| $V_{RB} = -4.0V$ | $-4.0V \rightarrow 0$ |

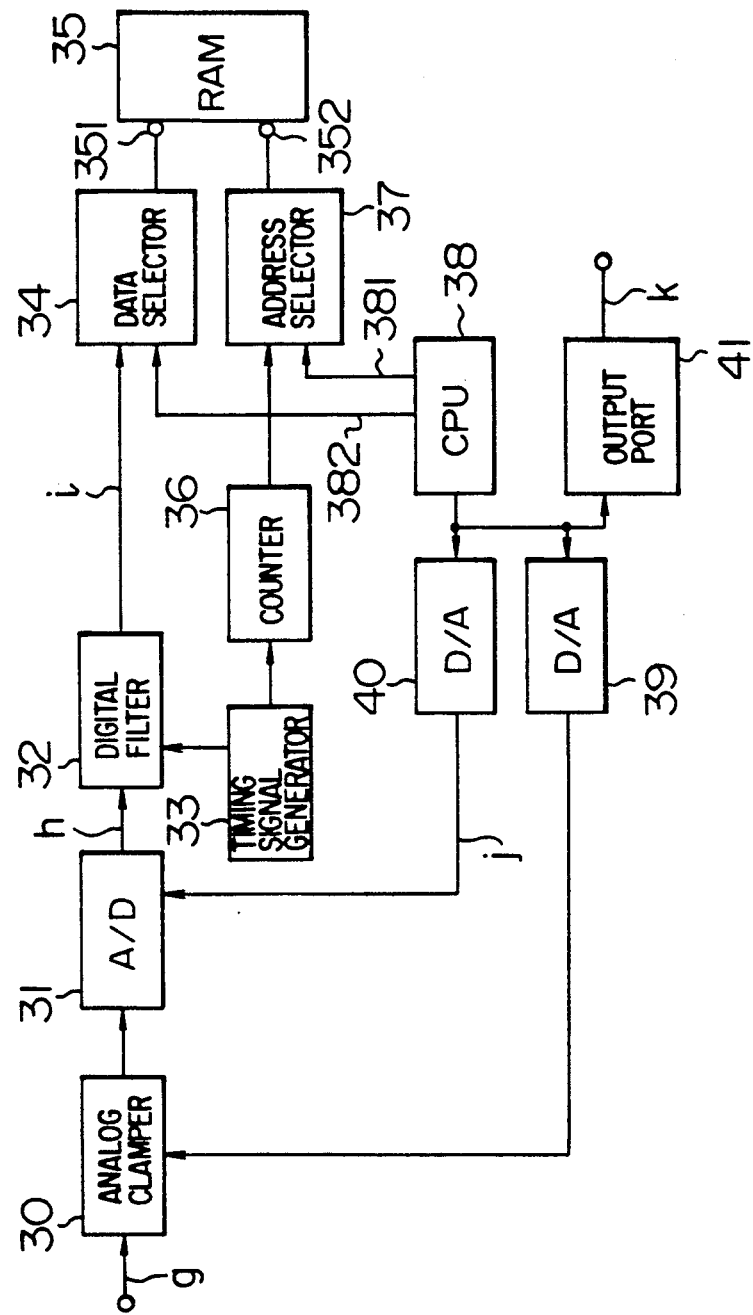
F I G. 4

CLAMP SIGNAL PROCESSING APPARATUS

TECHNICAL FIELD

The present invention relates to an image receiver control apparatus of a system transferring an image signal on which a clamp level reference signal and an amplitude reference signal are multiplexed.

BACKGROUND ART

Conventionally, a clamp level reference signal which is multiplexed with an image signal is used for detection of an amount of noise in addition to DC level restoration of the original image signal. A method of restoring a DC level is disclosed in the Japanese Unexamined Patent Publication JP-A-58-124373, for example. A method of performing the detection of the noise amount and control of a reproduction apparatus, by using the clamp level reference signal multiplexed with the image signal, is disclosed in the Japanese Unexamined Patent Publication JP-A-62-172879, for example. FIG. 1 shows an arrangement of a conventional image receiver control apparatus, in which the restoration of the DC level, the detection of the noise amount and automatic gain control are performed by using the above methods.

In FIG. 1, numeral 1 indicates an input signal, numeral 2 an analog clamper, numeral 3 an A/D converter and numeral 4 a digital output signal. The input signal 1 is clamped on a predetermined value by the analog clamper 2 and then the clamped signal is converted into, for example, an 8-bit digital signal by the A/D converter 3. A digital level comparator 5 determines a difference between a digital value obtained by A/D-converting a portion of the input signal corresponding to a clamp level reference signal and a predetermined digital value, e.g., a value "128". An integrator 6 integrates an output from the digital level comparator 5 and the integrated output is converted into an analog clamp level signal by a D/A converter 7. The analog clamp level signal is connected to the analog clamper 2 to form a feed-back loop, so that control is performed such that an average value of the digital values obtained by A/D-converting predetermined portions of the input signal is "128". Operation speeds of the digital level comparator 5 and the integrator 6 are the same as conversion speed of the A/D converter.

Numerals 8 to 17 indicates a circuit portion for detecting the noise amount. The values obtained by A/D-converting the clamp level reference signal ought to be substantially constant unless the noise is introduced. However, the values are usually different per each sample because of influence of noise on a transmission path. A variance of the sample values from the average value represents energy of the noise. Since generation of noise is a random process, it is necessary to use, as the noise level, a value obtained by processing on many sample values and a low pass filter processing in a time axis direction, i.e., a temporal filter processing to suppress their time variations. A difference between the sample values of the A/D-converted signal 4, one of which is delayed by one period of the same operation clock signal (to a terminal 19) as that of the A/D converter, is calculated by a flip-flop 8 and a subtracter 9. Then, the difference is sampled in a flip-flop 10 in response to the clock signal (b) supplied from a terminal 20. Next, a difference between the sampled values, one of which is delayed by one period of the clock signal (a) from a terminal 20, is determined by a flip-flop 11 and a subtracter 12. The timing when the clock signal (b) rises is during a period of the clamp level reference signal and indicates a timing of a signal used for noise detection. An absolute value of the difference is determined by a circuit indicated by numeral 13 and a signal corresponding to a noise level is obtained from the absolute value by a low pass filter in a time axis direction, i.e., a temporal filter 14. The temporal filter 14 is arranged as shown in FIG. 2 to suppress time variations of the input signal.

In FIG. 2, numeral 21 indicates a subtracter, numeral 22 an amplifier of gain K1, numeral 23 an adder, numeral 24 a delay circuit, and numeral 25 an amplifier of gain K2. A circuit portion constituted by the amplifier 22, the adder 23 and the delay circuit 24 is a digital integrator 26. More particularly, a value obtained by multiplying an input to the integrator 26 by K1 is added to a previous value, and hence, when a constant input value is given, an output of the integrating circuit varies with an inclination proportional to the input value. The subtracter 21 is provided before the integrating circuit, and a signal obtained by multiplying the output from the integrator by K2 by the amplifier 25 is supplied to the subtracter 21 to form a feed-back loop, as shown in FIG. 2. With such an arrangement, when an adequate positive input (f) is given, the output from the integrator 26 increases gradually. However, the greater the output from the delay circuit 24 becomes, the greater the feed-back value becomes. As a result, the output of the subtracter 21 obtained by subtracting the output of the amplifier 25 from the input (f) becomes so small that the output from the integrator 26 varies slowly. Ultimately, the output from the integrator 26 is made stable to be a constant value proportion t the input value.

Therefore, the circuitry arranged as shown in FIG. 2 functions as a so-called temporal filter for suppressing variations in the time direction. A threshold circuit 15 quantizes the detected noise amount (c) into, for example, four levels to switch a degree of noise reduction into four levels.

Numerals 16 to 18 indicates a system for automatic gain control. A deviation of an amplitude reference signal, which is included in a digital signal into which the input analog signal from the terminal 1 is converted by the A/D converter 3, from a predetermined value is detected by a digital gain detector 16. Closed loop DC gain is made so great by the integrating circuit 17, as well as influence of noise is eliminated, that an offset error does not occur. An output from the integrator 17 is converted into an analog signal by a D/A converter 18 and the converted analog signal is supplied to the A/D converter 3 as an A/D reference voltage (e) to form a feed-back loop for control of the gain of the A/D converter 3 such that a signal obtained by A/D-converting the amplitude reference signal of the input signal represents a predetermined digital value.

However, in the image receiver control apparatus of such a system, a system for calculating the clamp level, a system for detecting the noise level and a system constituted by many circuits of the apparatus for the automatic gain control are separately provided. Therefore, there is a problem in that the apparatus needs large scale hardware. In addition, many circuits of the apparatus such as the digital level comparator 6, the integrators 6, 17, and 26 and the like need to be able to operate with the same operation clock signal (a) having a relatively high frequency as that for the A/D converter. Therefore, there is a problem in that the conventional apparatus has the disadvantage in power consumption. Further, since the detected noise level is only quantized into about four levels for control of noise reduction, the noise reduction level changes frequently in a step manner because of slight fluctuation of the remaining noise level when the noise level (c) is accidentally close to one of a plurality of threshold values of the threshold circuit 15. More particularly, although the noise level included in the input signal supplied from the terminal 1 does not change substantially, the noise reduction level occasionally changes. This means that a S/N ratio of display on a screen changes during receiving the image such as a still image. Therefore, there is a problem in that the conventional apparatus has a disadvantage of remarkable quality degradation in the received image from a viewpoint of visual psychology. Moreover, operations of the clamp level processing circuit and the automatic gain control circuit are not connected with each other. Therefore, there is a problem in that the clamp level processing operation and the automatic gain control operation occasionally interfere with each other, so that there is a possibility that the operations become astable.

A case wherein the clamp level processing operation and the automatic gain control operation interfere with each other will be described below. As means for gain control, there is a method of controlling a conversion factor or ratio between the input analog signal and the output digital value by changing a reference voltage of the A/D converter. Many of A/D converters generally have such reference voltage input terminals. The above scheme is effective since gain control by means of such a method is simple in configuration and does not need a special gain control amplifier or the like. Generally, in the inside of the A/D converter, there are a reference voltage for determining an input analog level which provides a maximum of the output digital value and a reference voltage for determining the input analog level which provides a minimum of the output digital value, and a difference between these two voltages is reversely proportional to A/D conversion gain. However, there is an A/D converter in which only one of the these reference voltages is provided to the outside of the converter or can hardly be changed in order for securing its performance. In such an A/D converter, the conversion gain must be controlled by controlling the other.

FIGS. 3A and 3B show operation examples of the A/D converters in which the conversion gain control is performed by only one of the above reference voltages. In the figure, relations among the reference voltage, the input analog voltage and digital output value are represented. In FIG. 3A, assume that the number of bits of the A/D converter is "8", the reference voltage for determining the input analog level which provides a maximum of the output digital value is $V_{RT}$ (−1.0 V), and the reference voltage for determining the input analog level which provides a minimum of the output digital value is $V_{RB}$ (−3.0 V). Also, assume that a reference value of the clamp level for the input analog signal supplied to the terminal 1 is −2.0 V and a corresponding digital signal is "128". In the system operating in such states, assume that a DC restoration level of the input signal supplied to the terminal 1 is not changed and an amplitude of the input signal increases in a step manner. Since the DC restoration level is not changed, the reference value of the clamp level should be remained to be −2.0 V. When the amplitude of the input signal was increased, it is assumed that the reference voltage (e) to the A/D converter 3 is changed from −3.0 V to, for example, −4.0 V by the operation of the automatic gain control system constituted by circuits 16 to 18. As a result, the difference between the voltages $V_{RT}$ and $V_{RB}$ becomes so large that the conversion gain of the A/D converter 3 becomes small to compensate for the increase in the amplitude of the input signal. However, when the digital value of a signal obtained by A/D-converting the reference value of the clamp level −2.0 V is a greater value than 128, e.g., 170, an error signal is detected, as well as when the DC restoration level was very much changed from value "128". As a result, there was a possibility that the clamp level control operation became astable or it took a long time until the clamp level would return to its normal state. Since there is no change in the DC restoration level of the input signal, the change of the clamp level ought to be not detected. However, when the A/D converter is used, in which the gain control is performed by only one reference voltage, the disturbance is transferred to the system for performing the clamp level control as if the DC level was simultaneously changed, even though only the gain variation was generated. That is, the conventional apparatus has a drawback that the change in the amplitude of the input signal influences the DC restoration level.

DISCLOSURE OF INVENTION

The present invention realizes an image receiver control apparatus for performing clamp signal processing in which the problems in the conventional apparatus can be dissolved and a received image of high quality can be provided regardless a simple configuration. The present invention is characterized in that a signal obtained by A/D-converting an input signal is written in a memory through a digital filter having variable characteristics and read out from the memory by a central processing unit (to be referred to as a CPU hereinafter) to be operated such that calculation of a clamp level, detection of an amount of noise, quantization of the noise amount, automatic gain control, and the like are collectively performed at the CPU.

BRIEF DESCRIPTION OF DRAWINGS

FIG. 4 is a block diagram showing an arrangement of an image receiver control apparatus according to an embodiment of the present invention;

BEST MODE FOR CARRYING OUT THE INVENTION

An embodiment of the present invention will be described below. FIGS. 4 to 9 show the embodiment of the present invention.

Figure 5:
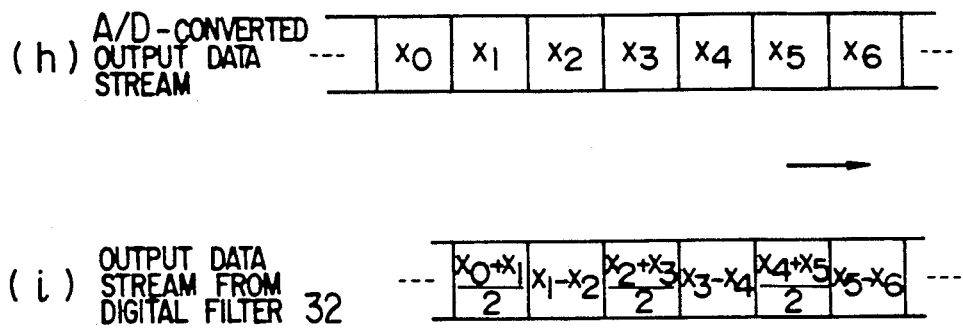
FIG. 5 is an illustration for explaining an example of an operation of a digital filter having variable characteristics in the apparatus.

In FIG. 4, it is assumed that 256 samples of a clamp level reference signal are included in an input signal (g) for one field, for example. The input signal (g) is clamped to a predetermined level by an analog clamper 30 and the clamped signal is converted into a digital data signal by an A/D converter 31 with a predetermined sample frequency, e.g., 16 MHz (FIG. 5 (h)). Signal portions of the digital data signal corresponding to a clamp level reference signal is subjected to an operation by means of a digital filter 32. For example, an operation, in which sums and differences of adjacent two signals are sequentially and alternately calculated, can be considered as the operation to be performed by the digital filter 32. In this case, outputs from the digital filter 32 are as shown in FIG. 5 (i). What operation is to be performed by the digital filter is controlled by a timing signal generator 33 which operates in synchronism with an image signal. The outputs (i) from the digital filter 32 are supplied to a data input terminal 351 of a RAM 35 via a data selector 34. The above timing signal generator 33 controls an initial count value of a counter 36 and an output from the counter 36 is directed to an address input terminal 352 of the RAM 35 via address selector 37. In this manner, the clamp level reference signal of the input signal is A/D-converted, the sum of adjacent A/D-converted signal portions or the difference between them is calculated, and then the calculated result is stored into the RAM 35 at a given address. After writing of all data into the RAM 35 is completed, a CPU 38 manipulates all the data stored in the RAM 35 to perform calculation of a clamp level, detection of a noise level and calculation for automatic gain control. Numeral 382 indicates a CPU data bus and numeral 381 indicates a CPU address bus.

A processing operation of the image receiver control apparatus, which is configured as described above, according to the embodiment of the present invention will be described below.

Calculation of the clamp level by the CP 38 is performed every field. Assuming that a clamp reference level is a central level of an 8-bit digital signal, i.e., a value "128", the A/D-converted signal represents an error of a clamp level from the clamp reference level in its original form if a value represented by the A/D-converted signal is regarded as an offset binary value. That is, the digital signal obtained by A/D-converting the clamp level reference signal can be used, as it is, as a signal representing error of the clamp level. Data used in the calculation of the clamp level is obtained from the sum of two adjacent samples of the clamp level reference signal determined by the digital filter 32. In calculation of the clamp level by the CPU 38, 128 data written in the RAM 35 as the sums of every two adjacent samples are used. Since each of 128 data is an average of the sum of the two adjacent samples, the number of addition or summing operations in this case can be decreased to ½ of that in a case where the addition average operation is directly performed for the 256 samples of the clamp level reference signal, thereby decreasing the load of the CPU for software processing. Though the addition operation is very easy for the CPU 38, the number of operations is so many that the load of the CPU 38 becomes heavy. Therefore, decreasing the number of addition operations from 256 to 128 contributes very much to decreasing the load of the CPU 38. The 128 data obtained by the adding and averaging operations are then subjected to an integration operation. The integration operation is performed to remove an offset error by setting a DC gain to an infinite value. The above 128 data may be directly subjected to the integration operation without performing the adding and averaging operations. In the case, however, it is necessary to check whether or not overflow occurs every time each the adding operation is performed. Therefore, when the integration operation is performed by a software manner, there is the disadvantage in the time required for the operation. When the integration operation is performed after the adding and averaging operations, it is performed by 128 adding operations and, one adding operation for the integration operation, and one overflow check operation. As a result, one adding operation is added but there is the advantage in that 127 overflow check operations can be omitted. The signal subjected to the integration operation is converted into an analog signal by a D/A converter 39 and then the analog signal is connected to the analog clamper 30 to form a feed-back loop such that the average value of the samples of the signal obtained by A/D-converting the clamp level reference signal included in the input signal to a terminal 1 is 128.

An operation for automatic gain control by the CPU 38 is performed by using a frame pulse signal transmitted every frame as an amplitude reference signal. When the frame pulse signal has two levels, a deviation value of the difference between the two levels from a predetermined value represents an error with respect to a normal gain. In the operation for the automatic gain control, a sum of the two adjacent signal samples by the digital filter 32 is used. In the operation for the automatic gain control by the CPU 38, about 20 data written in the RAM 35, each of which is the sum of every two adjacent signal samples, are used. Since each of the 20 data is an addition average value of the adjacent signal samples, the number of addition operations in this case can be decreased to ½ of that in a case where 40 data of the frame pulse signal, which is also used as the amplitude reference, are directly subjected to the addition average operation, and thereby the load of the CPU for software processing can be decreased. Though the addition operation is very easy for the CPU 38, the number of the operations is so many that the load of the CPU 38 becomes heavy. Therefore, decreasing the number of the addition operations by a factor of ½ contributes very much to decreasing the load of the CPU 38. The data subjected to the addition average operations are subjected to the integration operation. The integration operation is performed to remove an offset error by setting DC gain to an infinite value. The above 20 data may be directly subjected to the integration operation without performing the addition average operations. In the case, however, it is necessary to check whether or not the operation result overflows every time each data is added. Therefore, when the operation is performed by a software manner, there is the disadvantage in the time required for the operation. When the integration operation is performed after the addition average operations, 20 addition operations in the addition average operations, one addition operation in the integration operation, and one overflow check operation are only required. As a result, one addition operation is added but there is the advantage in that 19 overflow check operations can be omitted. The signal subjected to the integration operation is converted into an analog signal by a D/A converter 40 and the analog signal is connected to the A/D converter 31 as a reference voltage (j) to form a feed-back loop and controls the conversion gain of the A/D converter 31 such that the difference between the two levels of the frame pulse signal is the predetermined value.

Figure 6:
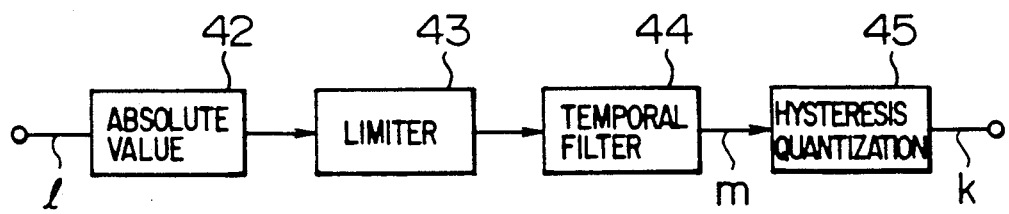
FIG. 6 is a block diagram showing an arrangement of a noise level detection processing circuit having a limiter according to the embodiment of the present invention.
Figure 7:
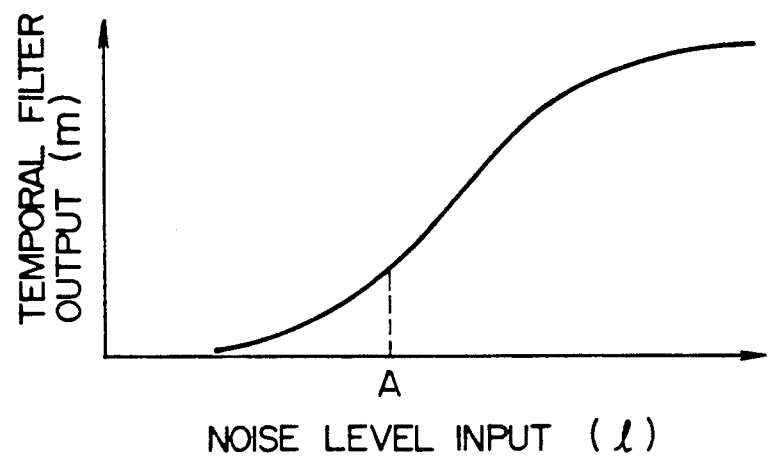
FIG. 7 is a graph showing noise amount detection characteristics in the present invention.

FIG. 6 shows a procedure of calculation processing of a noise level according to the present invention. The difference between two adjacent signal samples obtained by the digital filter 32 in FIG. 4 is used as data for detection of the noise level. The difference data (1) is subjected to absolute value processing 42 and then limiter processing 43. In addition, the result of the limiter processing is suppressed drift in time axis direction by temporal filter processing 44 and then subjected to hysteresis quantization processing 45 for quantizing it into few levels, with the result that a noise reduction control signal (1) is obtained. In calculation of a noise level by the CPU 38, 128 difference data written in the RAM 35 are used. Thus, software processing for determining differences between the many sample values can be omitted. These processing which can be omitted are very simple and very easy for the CPU 38. However, the number of data to be operated are so many that the load of the CPU 38 becomes heavy. By providing a digital filter 32 and performing the simple operation many times by the digital filter 32, the CPU 38 can ensure capability for performing a high level of operation. The obtained differences between sample values are first subjected to the absolute value processing 42. An average value of values subjected to the absolute value processing basically corresponds to a noise level. Then, the limiter processing is performed to prevent the overflow from being caused in the following stage. This absolute value processing 42 and the limiter processing 43 can be performed simultaneously by a method of looking up a table or the like. This limiter processing 43 increases the probability that a clip operation is performed when the noise level becomes higher to some extent. However, since the noise is random, there are many cases where the clip operation is not performed. That is, even though the noise level becomes considerably high, a level obtained by averaging the output from the limiter processing does not immediately saturated, i.e., abrupt increase in the noise level is compressed, so that detection of the noise level can be performed in a wide dynamic range. This is a very advantageous characteristic when the operation is performed in the limited number of bits. FIG. 7 shows an input-output characteristic, i.e., noise amount detection characteristic, by the absolute value processing 42, the limiter processing and the temporal filter processing in FIG. 6.

Note that, since a noise pulse having a large amplitude is generated sometimes even if the average noise level is lower than a predetermined level, a value of a detected noise level is not so much small when the noise level is lower than a level shown by a point A in FIG. 7. However, if the point A is set to a level lower than a practically available noise level, an actually effective region for detecting the noise amount can be ensured widely.

Figure 1:
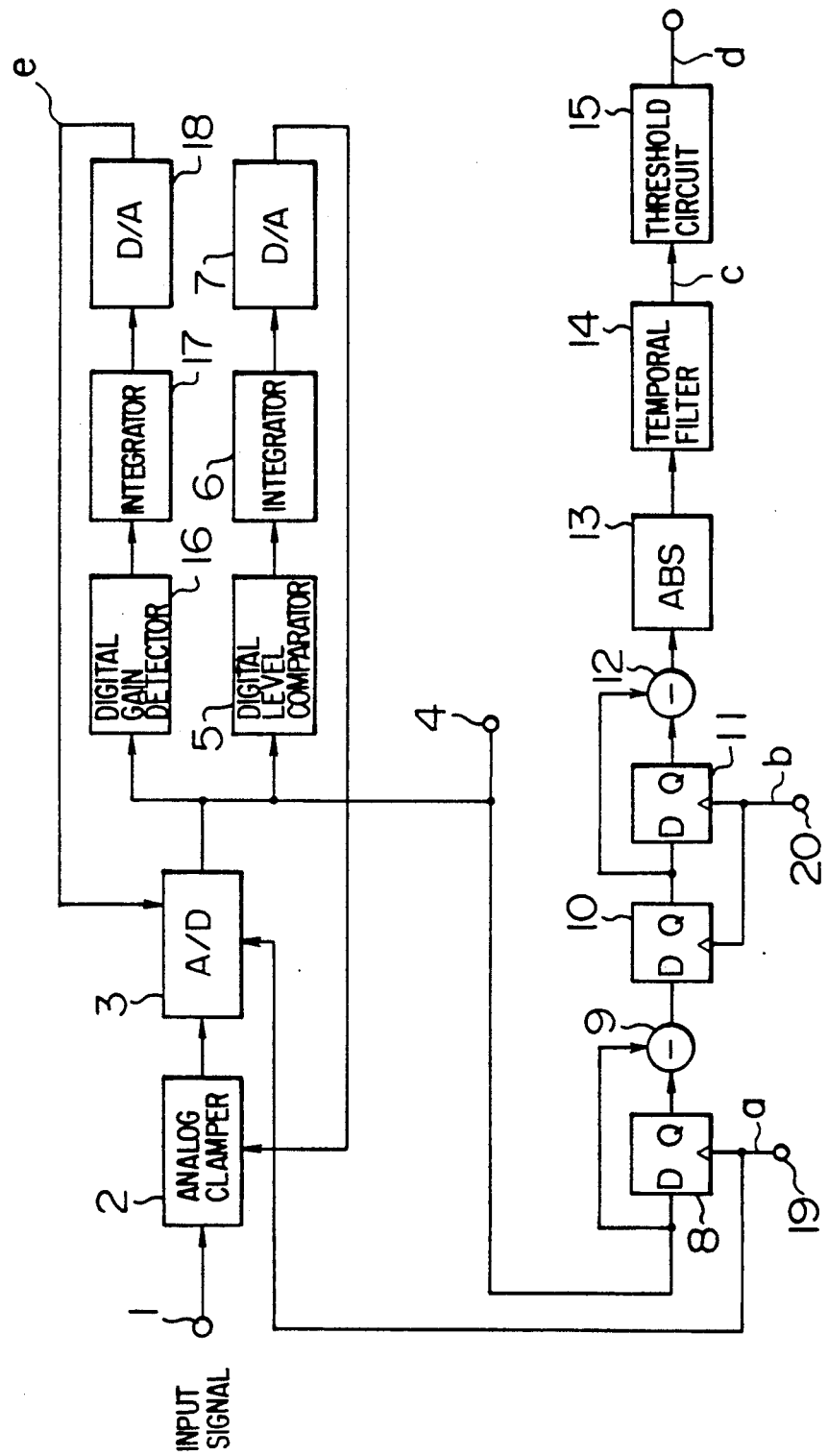
FIG. 1 is a block diagram showing an arrangement of a conventional image receiver control apparatus for performing clamp level processing, detection of a noise level, and automatic gain control.
Figures 2, 3A, 3B:
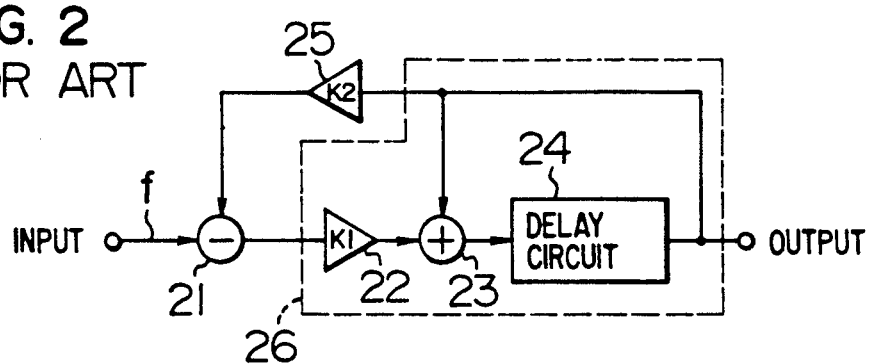
FIG. 2 is a block diagram showing an arrangement of a conventional temporal filter.
FIGS. 3A & 3B illustrate an operation of gain control in an A/D converter.
Figure 8:
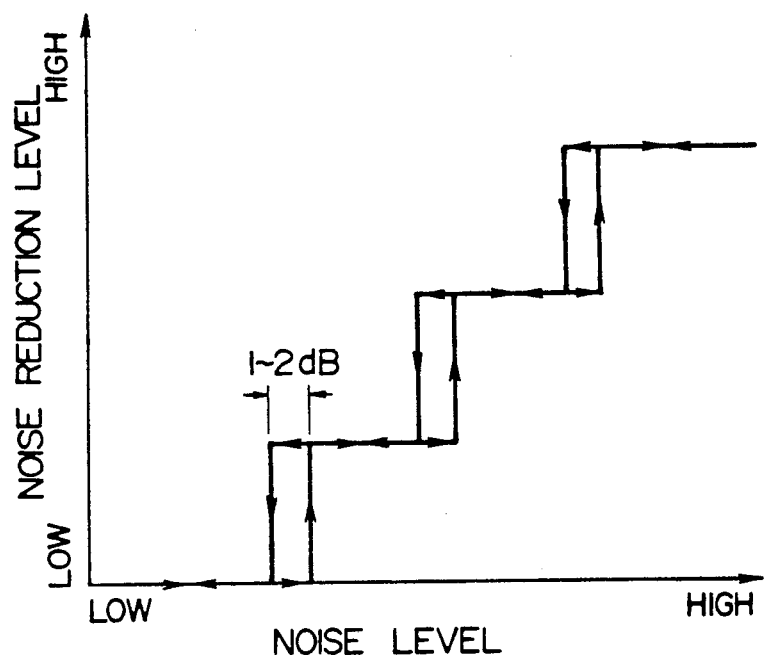
FIG. 8 is a graph showing quantization processing having hysteresis characteristics according to the embodiment of the present invention.

With a signal corresponding to the detected noise amount, signal change in a temporal axis direction is suppressed by performing the temporal filter processing. The processing can be performed by software processing equivalent to the circuits shown in FIG. 2. If the output (m) from the temporal filter is quantized into four levels in its original state to perform the noise reduction control, when a value of the temporal filter output (m) happens to be nearby a quantization threshold value, a level of the noise reduction control often changes even though the value of the temporal filter output (m), i.e., the noise level is almost constant, thereby considerably degrading quality of the received image in the standpoint of visual psychology. In order to prevent the above degradation, quantization processing 45 of the noise level, in which the noise level is quantized into the four levels, is performed to have hysteresis characteristics, as shown in FIG. 8, and the result of the quantization processing is outputted from the output port 41 a the noise reduction control signal (k). A width of the hysteresis is preferably 1 or 2 dB from the experimental result. Actually, change in the average noise level for a few seconds is within 1 or 2 dB in a stably receiving state. Therefore, by providing such hysteresis characteristics, often change in the noise reduction level can be avoided.

Figure 9:
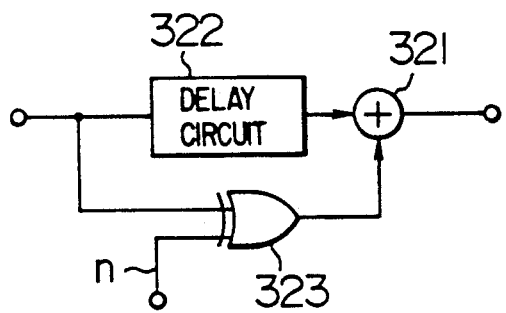
FIG. 9 is a block diagram showing an arrangement of the digital filter having variable characteristics in the embodiment of the present invention.

The digital filter 32 can be simply configured by an adder 321, a delay circuit 322, and an exclusive OR circuit 323, as shown in FIG. 9, for example. In FIG. 9, a symbol (n) indicates a characteristics control signal for controlling the characteristics of the digital filter 32 and selects the sum operation of the adjacent signal samples or the difference operation between them performed by the digital filter 32.

In the embodiment, high speed processing is required only in the digital filter 32, and, as described above, the digital filter 32 can be realized by such relatively simple configuration as shown in FIG. 9. Therefore, there is the advantage in power consumption.

In addition, by detecting a scene changing state, smooth noise reduction control can be performed when detected noise level is quantized and controlled synchronously with the detected scene changing state.

Further, with the arrangement of the present invention, even when change in the amplitude of the input signal is caused, the gain control can be performed independently of the clamp level control without transferring influence due to the change in the amplitude of the input signal to a system for the clamp level control, since the operating states of the clamp level processing and automatic gain control processing can be simultaneously known by the CPU 38. For example, by performing the operation while correcting or modifying the error of the clamp level from the clamp reference level in correspondence with a digital value output from the D/A converter 40 which outputs the reference voltage (j) for controlling the conversion gain of the A/D converter 31, it is possible to avoid that the gain control operation influence the clamp level control operation. That is, a value of a signal obtained by A/D-converting the clamp level reference signal is replaced by a smaller value when the conversion gain of the A/D converter 31 is smaller than a standard value and by a greater value when the conversion gain is greater than the standard value, and the operation for the clamp level is performed in accordance with the replaced value. The replacement operation can be simply realized by a table looking up instruction for the CPU 38.

It is described in the embodiment of the present invention that the operation by the digital filter 32 is effective for decreasing the load of the CPU 38. However, when the CPU has enough capacity, the digital filter 32 may be all band pass filter or the digital filter 32 may be omitted.

INDUSTRIAL APPLICABILITY

As described above, in the image receiver control apparatus of the present invention, an A/D-converted signal is written into a RAM via a digital filter having variable characteristics, and read out from the RAM by the CPU for restoration of a DC level of the input signal, control of the A/D conversion gain for the input signal, and detection of the noise amount introduced during transfer and storing. As a result, the noise reduction control can be performed without visual incompatibility. In addition, since the CPU collectively performs processing for both an input level control system and a clamp level control system, interference between the input level automatic gain control system and the clamp level control system can be eliminated very much. Therefore, a receiving system having stable and good response characteristics can be realized with a simple hardware configuration.

What is claimed is:

1. A clamp signal processing apparatus comprising:
an analog clamper for clamping an input signal on a predetermined DC level;
an A/D converter for A/D converting an output from said analog clamper with a predetermined sample period of time;
a timing signal generator;
a counter controlled by said timing signal generator;
a random access memory (RAM);
a central processing unit (CPU) for performing an operation of determining a clamping level and a noise level;
a data selector for selecting one of an output signal from said A/D converter and a data signal on a data bus connected to said CPU to supply the selected data signal to said RAM;
an address selector for selecting one of an address from said counter and an address on an address bus connected to said CPU to supply the selected address to said RAM; and
a D/A converter,
and wherein the data signals stored in said RAM are subjected to an operation by said CPU such that noise reduction control signal in correspondence with a level of noise introduced during transfer or recording is determined by obtaining the variance of the data signals stored in said RAM, said noise reduction control signal is outputted from an output port of said CPU, a clamp level signal is determined by smoothing the data signals stored in said RAM and said clamp level signal is outputted from said D/A converter.

2. An apparatus according to claim 1, wherein the data signals stored in said RAM are obtained by A/D-converting a clamp level reference signal and a gain reference signal included in the input signal, the clamp level signal is outputted from a first D/A converter, a signal for gain control is outputted from a second D/A converter, and the noise reduction control signal is outputted from said output port.

3. A clamp signal processing apparatus comprising:
an analog clamper for clamping an input signal to a predetermined DC level;
an A/D converter for A/D-converting an output from said analog clamper with a predetermined sample of time;
a digital filter for performing an operation of predetermined frequency characteristics for an output from said A/D converter;
a timing signal generator for controlling the frequency characteristics of said digital filter in response to a period obtained by multiplying the sample period of time by a factor of an integer;
a counter controlled by said timing signal generator;
a random access memory (RAM);
a central processing unit (CPU) for performing an operation of determining a clamping level and a noise level;
a data selector for selecting one of an output signal from said digital filter and a data signal on a data bus connected to said CPU to supply the selected data signal to said RAM;
an address selector for selecting one of an address from said counter and an address on an address bus connected to said CPU to supply the selected address to said RAM; and
a D/A converter,
and wherein the data signals stored in the RAM are subjected to an operation by said CPU such that a noise reduction control signal in correspondence with a level of noise introduced during transfer or recording is determined by obtaining the variance of the data signals stored in said RAM, said noise reduction control signal is outputted from an output port of said CPU, a clamp level signal is determined by smoothing the data signals stored in said RAM and said clamp level signal is outputted from said D/A converter.

4. An apparatus according to claim 3, wherein the data signal stored in said RAM are obtained by passing signals, into which a clamp level reference signal and a gain reference signal included in the input signal are A/D-converted, through said digital filter having the predetermined characteristics, the clamp level signal is outputted from a first D/A converter, a signal for gain control is outputted from a second D/A converter, and the noise reduction control signal is outputted from said output port.

5. An apparatus according to claim 1, wherein the clamp level signal is obtained by performing an operation for the signals obtained by respectively A/D-converting the clamp level reference signal and the amplitude reference signal.

6. An apparatus according to claim 5, wherein the clamp level signal is obtained by determining a difference signal between a predetermined level and a signal obtained by A/D-converting the clamp level reference signal, integrating the difference signal, and performing an operation in accordance with the signal for the gain control of said A/D converter which is obtained by processing the signal obtained by A/D-converting the amplitude reference signal included in the input signal.

7. An apparatus according to claim 1, wherein the noise reduction control signal is obtained by determining an absolute value of a difference between predetermined sample values of the clamp level reference signal and passing the absolute value through limiter means and quantizing means having hysteresis characteristics.

8. An apparatus according to claim 3, further comprising means for updating the noise reduction control signal in synchronism with a scene change of an input image.

9. An image receiver control apparatus according to claim 3, wherein the clamp level signal is obtained by performing an operation for the signals obtained by respectively A/D-converting the clamp level reference signal and the amplitude reference signal.

10. An image receiver control apparatus according to claim 3, wherein the noise reduction control signal is obtained by determining an absolute value of a difference between predetermined sample values of the clamp level reference signal and passing the absolute value through limiter means and quantizing means having hysteresis characteristics.

11. An image receiver control apparatus according to claim 9, wherein the clamp level signal is obtained by determining a difference signal between a predetermined level and a signal obtained by A/D-converting the clamp level reference signal, integrating the difference signal, and performing an operation in accordance with the signal for the gain control of said A/D converter which is obtained by processing the signal obtained by A/D-converting the amplitude reference signal included in the input signal.

* * * * *